(12) United States Patent
Eguchi

(10) Patent No.: US 7,222,973 B2
(45) Date of Patent: *May 29, 2007

(54) IMAGE PROJECTION APPARATUS

(75) Inventor: Masaharu Eguchi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/532,339

(22) Filed: Sep. 15, 2006

(65) Prior Publication Data

US 2007/0008505 A1 Jan. 11, 2007

Related U.S. Application Data

(63) Continuation of application No. 10/892,810, filed on Jul. 16, 2004, now Pat. No. 7,108,375.

(30) Foreign Application Priority Data

Jul. 31, 2003 (JP) .............................. 2003-284399

(51) Int. Cl.
  *G03B 21/20* (2006.01)
  *G03B 3/00* (2006.01)
  *G03B 21/14* (2006.01)
  *H04N 3/22* (2006.01)

(52) U.S. Cl. ..................... 353/85; 353/101; 348/745; 352/140

(58) Field of Classification Search ................. 353/30, 353/69, 70, 85, 101, 121, 122; 348/745, 348/806; 349/5, 7, 9, 8; 352/140
  See application file for complete search history.

(56) References Cited

U.S. PATENT DOCUMENTS

| 6,846,081 B2 * | 1/2005 | Mochizuki et al. ........... 353/70 |
| 6,962,416 B2 | 11/2005 | Ohara |
| 6,974,217 B2 | 12/2005 | Kimura et al. |
| 7,108,375 B2 * | 9/2006 | Eguchi ........................ 353/30 |

FOREIGN PATENT DOCUMENTS

| JP | 4-338707 | 11/1992 |
| JP | 11-109214 | 4/1999 |
| JP | 2000-295443 | 10/2000 |
| JP | 3120526 | 10/2000 |

\* cited by examiner

*Primary Examiner*—Melissa Jan Koval
(74) *Attorney, Agent, or Firm*—Morgan & Finnegan, LLP

(57) ABSTRACT

An image projection apparatus is disclosed with which problems, caused by performing focusing control in a state in which the light amount of a light source is insufficient, can be avoided. The image projection apparatus comprises a controller, performing focusing control of a projection optical system, and a brightness detector which detects at least one of a brightness of the light source and a brightness of a reflected light on a projection surface. After turning the light source on, the controller restricts the focusing control until the brightness detected by the brightness detector reaches a predetermined value.

2 Claims, 8 Drawing Sheets

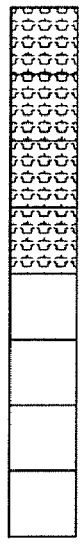
FIG.4B
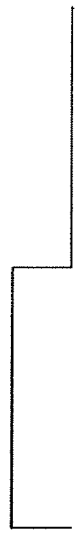
FIG.4D
FIG.4F
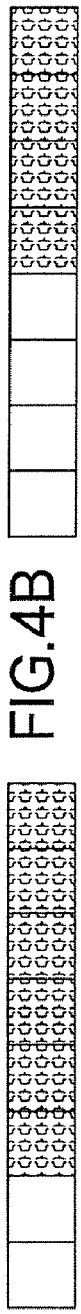
FIG.4A
FIG.4C
FIG.4E
FIG.4G
FIG.4H

IMAGE PROJECTION APPARATUS

This is a continuation of prior application Ser. No. 10/892,810, filed Jul. 16, 2004 now U.S. Pat. No. 7,108,375, now allowed. The prior application is incorporated herein by reference in its entirety.

CLAIM OF PRIORITY

This application claims priority from Japanese Patent Application No. 2003-284399 filed on Jul. 31, 2003, which is hereby incorporated by reference.

BACKGROUND OF THE INVENTION

1. Field of the Invention

The present invention relates to an image projection apparatus, such as a liquid crystal projector, etc., and particularly relates to an image projection apparatus with an autofocusing function.

2. Description of the Related Art

With regard to an AF (Auto Focus, referred to hereinafter as "AF") operation of a conventional projector, an AF operation is started when a focus switch is pressed.

Known AF techniques include active methods, wherein AF operation is carried out upon performing distance determination by measuring the propagation time of an ultrasonic signal or based on the principles of triangulation using infrared light, and passive methods, wherein a lens is driven upon reading the contrast of brightness across a screen by means of a pair of light receiving line sensors and determining the distance by obtaining the correlation values of the respective pixel outputs, etc., (see Patent Document 1).

The abovementioned passive methods can be largely classified into two types, one type being the so-called two-image correlation (or displacement detection) AF method, wherein a pattern which is prepared in advance is read and projected and used as an AF chart to improve the precision of AF (see Patent Document 2), and the other type being the AF method called sharpness detection or contrast detection (hill-climbing) method, wherein the AF operation is performed by using an optical sensor with a one-dimensional or two-dimensional pixel configuration, and this type is used in many digital cameras and home videos.

Here, in the case where a projection light of the projector is used for focusing, though there will be no problem if the light source can provide adequate brightness without waiting from the turning ON of power, in the case where a high-pressure discharge lamp or other light source with a long required lighting time is used, there was the possibility for an AF operation being performed even when the brightness is inadequate for passive AF, thereby leading to erroneous AF operation.

The example proposed in Patent Document 3 may be cited as an example of an AF operation of an image reading apparatus wherein the AF operation is prohibited upon judging that the circumstances present a problem in terms of the precision of the AF operation.

Specifically, in an image reading apparatus having a reading unit that scans and reads in an enlarged projected image of a microfilm, the region in which the image is to be read is set and the reading unit performs sampling for autofocusing within the set region. A projection lens for projecting the enlarged projected image is made removable and when the projection lens is removed, the AF operation is restricted. Further, the AF operation is restricted when the occurrence of a system error is detected and the AF operation is restricted when the projection lens is not attached.

[Patent Document 1] Japanese Patent Application Laid-Open No. H4 (1992)-338707
[Patent Document 2] Japanese Patent No. 3120526
[Patent Document 3] Japanese Patent Application Laid-Open No. 2000-295443
[Patent Document 4] Japanese Patent Application Laid-Open No. H11 (1999)-109214

However, arts concerning reductions of the time required for ranging and driving operation have hardly been proposed for AF mechanisms of the projection type image display apparatus such as the projector. This is because with an image projection apparatus, AF operation is often performed just once at the beginning and arts for speeding up an AF process were thus not viewed with much importance.

Propositions have also not been made in regard to speeding up optimal AF and specifically in regard to a driving method for setting the initial lens position in a projector, which has unique equipment application restrictions in terms of usage conditions, projection size conditions, etc., and there were inadequacies in terms of repressing unnecessary operation and erroneous operation by judgment of the circumstances during an AF operation.

The abovementioned Patent Document 4 discloses a projector wherein, for the purpose of initialization for subsequent use, a lens is driven to a predetermined position when the power is turned off. However, with the projector, the abovementioned function does not operate when the power is turned off hastily during the time for waiting for the end of cooling, etc. Furthermore, in the arrangement of the projector of the abovementioned Patent Document 4, initialization is performed when full completion is carried out from the standby state that is entered after the end of cooling.

The above arrangement thus has the problem that initialization is not carried out when the power is turned off hastily during the time for waiting for the end of cooling, etc. Also, in the case where full completion is carried out normally from the standby state after the end of cooling, the full completion time may become elongated due to standby drive. Difficulties thus exist in either case.

SUMMARY OF THE INVENTION

An object of the present invention is to avoid problems due to performing focusing control in a state in which the light amount of a light source is inadequate in an image projection apparatus that performs focusing control.

Another object is to propose, in view of usage methods for actual use, projection size, etc., an image projection apparatus, which, upon the turning on of power, standbys at a lens distance that matches the usage conditions.

Yet another object is to propose, in an image projection apparatus, wherein unique restrictions exist in terms of the usage method, projection size, etc., a method of driving a lens to an optimal initial lens position.

In order to achieve the above objects, a first aspect of an image projection apparatus of the present invention comprises a discharge type light source; an image forming element, modulating light from the light source; a projection optical system, projecting the light from the image forming element onto a projection surface; a controller, performing focusing control of the projection optical system; and a brightness detector, detecting at least one of a brightness of the light source and a brightness of a reflected light on the projection surface. Here, after turning the light source on, the controller restricts the focusing control until the brightness detected by the brightness detector reaches a predetermined value.

Another aspect of an image projection apparatus of the present invention comprises a discharge type light source; an image forming element, modulating light from the light source; a projection optical system, projecting the light from the image forming element onto a projection surface; a light receiving element, receiving a reflected light on the projection surface; and a controller, performing focusing control of the projection optical system by using the output from the light receiving element. Here, after turning the light source on, the controller restricts the focusing control until a brightness of the reflected light detected based on the output of the light receiving element reaches a predetermined value.

Yet another aspect of an image projection apparatus of the present invention comprises a discharge type light source; an image forming element, modulating light from the light source; a projection optical system, projecting the light from the image forming element onto a projection surface; a controller, performing focusing control of the projection optical system; and a brightness detector, detecting at least one of a brightness of the light source and a brightness of a reflected light on the projection surface. Here, after turning the light source on, the controller displays that the focusing control is in a restricted state until the brightness detected by the brightness detector reaches a predetermined value.

Yet another aspect of an image projection apparatus of the present invention comprises a discharge type light source; an image forming element, modulating light from the light source; a projection optical system, projecting the light from the image forming element onto a projection surface; a light receiving element, receiving a reflected light on the projection surface; and a controller, performing focusing control of the projection optical system by using the output from the light receiving element. Here, after turning the light source on, the controller displays that the focusing control is in a restricted state until a brightness of the reflected light detected based on the output of the light receiving element reaches a predetermined value.

Yet another aspect of an image projection apparatus of the present invention comprises a discharge type light source; an image forming element, modulating light from the light source; a projection optical system, including a focusing lens and projecting the light from the image forming element onto a projection surface; a controller, performing focusing control of the projection optical system; and a brightness detector, detecting at least one of a brightness of the light source and a brightness of a reflected light on the projection surface. Here, after turning the light source on, the controller restricts the focusing control until the brightness detected by the brightness detector reaches a predetermined value and drives the focusing lens to a predetermined position.

Yet another aspect of an image projection apparatus of the present invention comprises a discharge type light source; an image forming element, modulating light from the light source; a projection optical system, including a focusing lens and projecting the light from the image forming element onto a projection surface; a light receiving element, receiving a reflected light on the projection surface; and a controller, performing focusing control of the projection optical system by using the output from the light receiving element. Here, after turning the light source on, the controller restricts the focusing control until a brightness of the reflected light detected based on the output of the light receiving element reaches a predetermined value and drives the focusing lens to a predetermined position.

Yet another aspect of an image projection apparatus of the present invention comprises a light source; an image forming element, modulating light from the light source; a projection optical system, including a focusing lens and projecting the light from the image forming element onto a projection surface; and a controller, controlling a drive of the focusing lens. Here, after turning one of the light source and the image projection apparatus on, the controller drives the focusing lens to a predetermined initial position at once.

BRIEF DESCRIPTION OF THE DRAWINGS

FIGS. 4A through 4H (also referred generally as FIG. 4) illustrate a two-image correlation of the AF sensor.

DETAILED DESCRIPTION OF THE PREFERRED EMBODIMENTS

Embodiment 1

Figure 1:
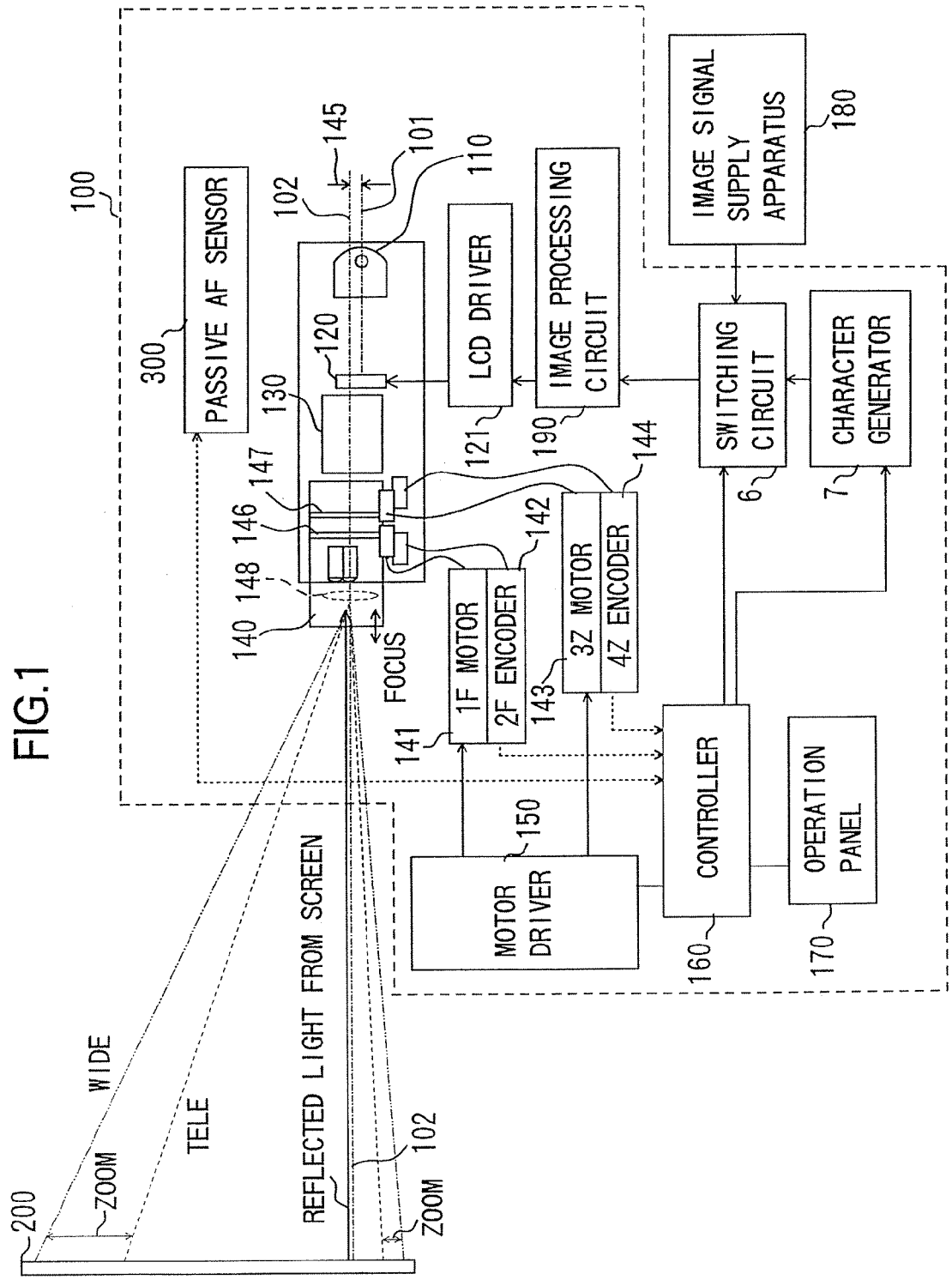
FIG. 1 is a block diagram of a liquid crystal projector provided with an AF function, which is Embodiment 1 of the present invention.

FIG. 1 shows a structure of a three-plate type liquid crystal projector (projection type image display apparatus) provided with an AF, which is Embodiment 1 of the present invention. In FIG. 1, Reference Numeral 100 denotes a liquid crystal projector. Reference Numeral 110 denotes a light source, Reference Numeral 120 denotes a transmission type liquid crystal display panel, Reference Numeral 130 denotes a cross dichroic prism, Reference Numeral 140 denotes a zoom projection lens (projection optical system), Reference Numeral 150 denotes a motor driver, and Reference Numeral 160 denotes a controller made up of a microcomputer.

Reference Numeral 170 denotes an operation panel, Reference Numeral 180 denotes an image signal supply apparatus such as a personal computer (PC), video, DVD player, television tuner, etc., Reference Numeral 190 denotes an image processing circuit, Reference Numeral 200 denotes a screen, and Reference Numeral 300 denotes a passive AF sensor (photoreception sensor)

The basic structure of the abovementioned projector 100 is a general structure as a three-plate type liquid crystal projector. That is, three transmission type liquid crystal panels 120 (only one channel is shown in the figure) are used, and the illumination light from the light source (discharge type light source such as a high-pressure mercury lamp, metal halide lamp, xenon lamp, or discharge type light source of short arc length) 110 is separated by a dichroic mirror (not shown) into color light components of the three channels; red R, green G, and blue B to illuminate each of the three liquid crystal display panels 120.

The liquid crystal display panel 120 is driven by an LCD driver 121 based on an image signal supplied from the image signal supply apparatus 180 and displays an original image of each channel corresponding to the image signals. When the abovementioned separated color light components are introduced into these liquid crystal display panels 120, the light components are modulated in accordance with the original images and then emerged from the liquid crystal display panels 120.

The color light components that have passed through the respective liquid crystal display panels 120 are color-combined by the cross dichroic prism 130 in such a way that their optical axes are aligned with one another, and enlarged and projected onto the screen 200 through the projection lens 140.

As indicated by the symbol 145, the optical axis 102 of the projection lens 140 is shifted upward (rises) with respect to the optical axis 101 of the illumination system. By thus shifting the position of the lens optical axis 102, the image that is projected onto the screen 200 is projected upward with respect to the lens optical axis 102, and in a case where projection is performed with the projector being set on a desk, it is possible to reduce screen vignetting by the desk itself.

The projection lens 140 is a zooming lens and the projection field-angle is changed on the screen 200 from the telephoto end to the wide-angle end as indicated by the arrow in the process of zooming. The distance from the optical axis 102 of the projection lens 140 to the screen end is enlarged or reduces in proportion to the magnification varying rate by zooming, and therefore the movement of the screen end on the lower side close to the optical axis 102 is relatively small.

On the outer circumference of the projection lens 140, a focus operation ring 146 and a zoom operation ring 147 each having an outer circumferential gear portions are provided. The focusing lens 148 and an unillustrated zooming lens making up part of the projection hens 140 are driven in the direction of the optical axis by the rotation of these operation rings 146 and 147, therefore focusing and field angle adjustment are performed, respectively.

The outer circumferential gear portions of these two operation rings 146 and 147 are respectively engaged with output pinion gears of a focusing motor 141 and a zooming motor 143, each of which is a geared motor that is integrated with a speed deceleration unit for electromotive drive. The operation rings 146 and 147 are electrically driven through outputs of the motors 141 and 143 and the focusing lens 148 and the zooming lens are driven. Focusing and zooming operation can also be performed through manual operations of the focus operation ring 146 and zoom operation ring 147.

For detecting the absolute positions of the operation rings 146 and 147 (that is, absolute positions of the focusing lens 148 and zooming lens), the outer circumferential gear portions of the operation rings 146 and 147 are respectively connected to potentiometer-type rotary encoders 142 and 144 via pinion gears (not shown), and these rotary encoders 142 and 144 output signals indicating the position of the current focusing lens 148 and the position of the zooming lens to the controller 160.

The focusing motor 141 and zooming motor 143 are driven and controlled by the controller 160 via a motor driver 150.

An image that is projected by the projector of this embodiment is selected by a switching circuit 6 from among an image based on the image signal from the image signal supply apparatus 180, an image based on the image signal from a character generator 7, which is used for OSD (onscreen display) of the operation mode, etc., and is often provided for a latest projector, and an image based on the image signal in an unillustrated memory. The selected image signal is subjected to a resolution conversion, gamma processing, non-interlace processing, etc., in accordance with the type of the image signal by the image processing circuit 190, and are then input into the liquid crystal display panels 120 after passing through an LCD driver 121 for the respective channels of R, G, and B.

The operation panel 170 is placed on the outer surface of the projector 100 and a group of switches for the turning ON/OFF of power, selection of the supply source of the projected image (that is, the original image), power zooming operation, power focusing operation, autofocus ON/OFF operation, and various mode settings are concentrated thereon. Also, the supply source of the selected projected image, the autofocus ON/OFF state, the mode that is set, etc., are displayed on the operation panel 170.

Figure 2:
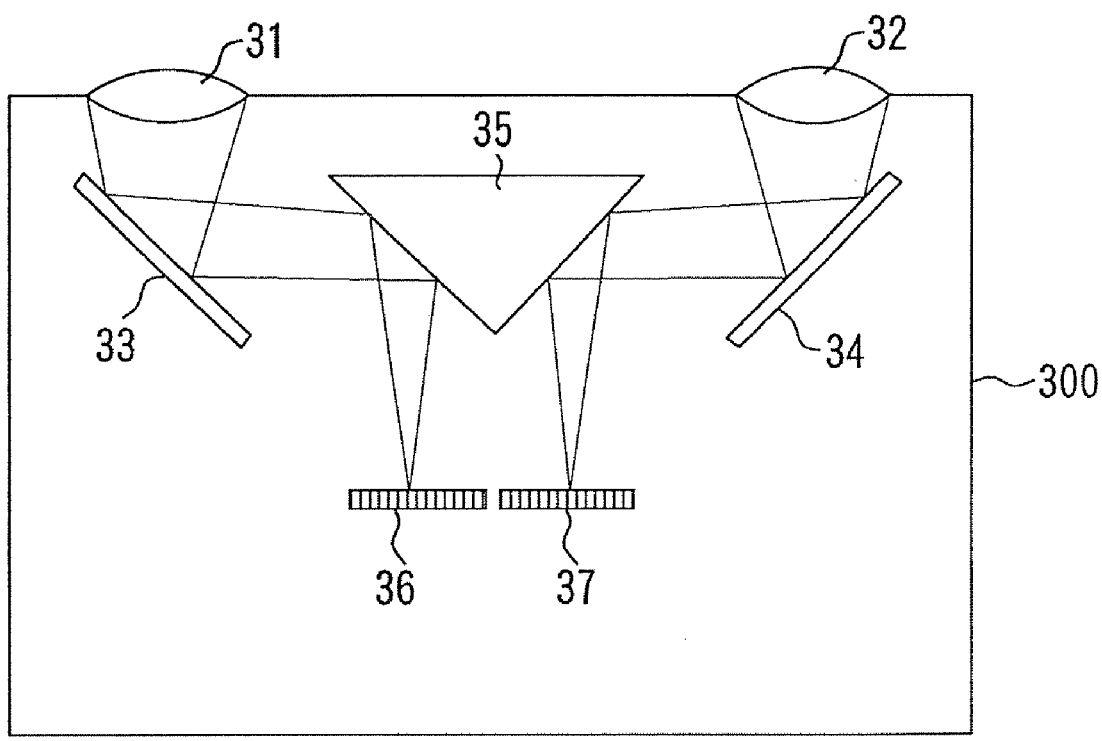
FIG. 2 is a block diagram of an AF sensor of the projector of Embodiment 1.

FIG. 2 shows a schematic structure example of the passive AF sensor 300. The passive AF sensor 300 receives reflected light from an area (field of view) including the lower side of the area where the image is projected on the screen 200 (image projection area), that is, the boundary between the image projection area and the non-image area where no image is projected.

The passive AF sensor 300 is designed to receive the abovementioned reflected light at a pair of line sensor R 36 and line sensor L 37 via a pair of lenses 31 and 32, which are placed apart by a predetermined distance that corresponds to be a base line length, a pair of mirrors 33 and 34, and furthermore via the reflecting surfaces of a prism 35.

The passive AF sensor 300 is placed in the vicinity of the projection lens 140 and its detection area set in such a way as to cross over part of the lower side of the image projection area on the screen 200. The base line length direction of the passive AF sensor 300 extends in the vertical direction and is substantially orthogonal to the lower side of the image projection area. The central axis of the field of view of the passive AF sensor 300 is substantially parallel to the optical axis 102 of the projection lens 140.

By positioning the passive AF sensor 300 inside the projector 100 in this manner, waste is reduced in terms of spatial efficiency because the passive AF sensor 300 is generally structured in a substantially quadratic prism shape.

Figure 3:
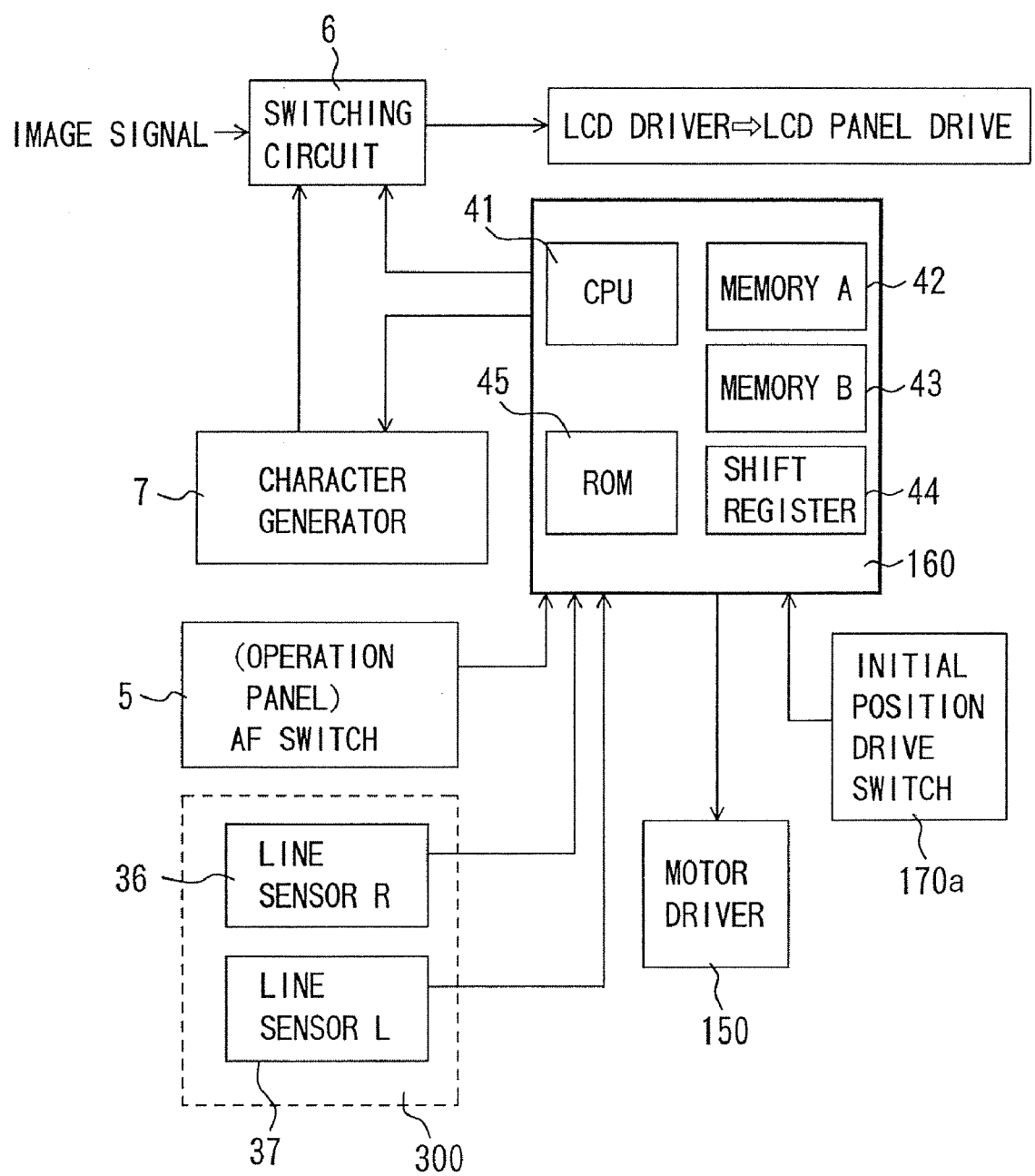
FIG. 3 is a schematic block diagram of an AF control circuit of the projector of Embodiment 1.

FIG. 3 shows a schematic structure of the circuit concerned with AF control. The controller 160 not only controls the entire projector system but also controls AF. The controller 160 has a CPU 41 as well as a memory A42, a memory B 43, a shift register 44 and a ROM 45.

Here, the memory A42 and the memory B43 individually store the image signals photoelectrically converted by the abovementioned line sensor R36 and line sensor L37 of the passive AF sensor 300. By performing gain switching in accordance with the signal level, saturation is repressed and the dynamic range of signals is expanded.

The shift register 44 is designed to be fed with, for example, image data of the memory A42 and sequentially shift the input image data. The CPU 41 then compares the data of the shift register 44 and the data of the memory B43 to detect a match between both data. The CPU 41 compares the shift amount at this time with the content of ROM 45 to determine the distance up to the screen 200, and sends the output for driving the focusing lens 148 to the motor driver 150.

Here, the ROM 45 stores the relationship between the shift amount of the shift register 44 and the distance to the screen 200 in the form of a table. The system can also be structured in such a way that a plurality of such table data are provided, data can be selected from the table using temperature as a parameter. An unillustrated temperature sensor may be added to the vicinity of the passive AF sensor 300 inside the projector 100 so that focusing variation due to temperature is reduced by selection of a lens drive amount calculation table or a drive amount calculation factor table. Good AF accuracy can thereby be secured in the projector in which temperature rise tends to occur.

Reference Numeral 5 denotes an AF switch that is provided on the operation panel 170. The operation signal of the AF switch 5 is sent to the switching circuit 6 via the controller 160. The switching circuit 6 switches the image signal, which is the source of the original image to be displayed on each liquid crystal display panels 120, from a video signal to a content of the projected image using a hardware background generation function of the character generator 7 in response to the operation of the AF switch 5.

In this case, the character generator 7 sends image signal, which indicate full white image without any non-background character display pattern or full gray image or image signal which indicate an image for AF detection equivalent to such images, to the LCD driver 121 in accordance with the instruction of the controller 160 and makes an original image, corresponding to the abovementioned image for AF detection, be displayed on the liquid crystal display panels 120.

The AF operation of the projector 100 arranged as described above shall now be described. This AF operation is preferably carried out before a normal video image is projected and displayed.

First, when the AF switch 5 provided on the operation panel 170 is operated and the switching circuit 6 switches to a state in which the character generator 7 is selected, the controller 160 outputs the content of the character generator 7 to the LCD driver 121. The abovementioned original image for AF detection is thereby displayed on each liquid crystal display panel 120 and the AF detection image is projected onto the screen 200.

Here, since the optical axis 102 of the projection lens 140 is shifted to the position at which the ratio of upper size to the lower size within the effective display area of the liquid crystal display panel 120 is 1 to 19, the projected image on the screen 200 is shifted with respect to the optical axis 102 of the projection lens 140 so that the ratio of the upper size to the lower size is 19 to 1. And the projected image is projected with an apparent angle of elevation so that there is not distortion.

The detection angle of the passive AF sensor 300 is set to approximately 10 degrees in the base line length direction and the lower side of the projected image is included in the detection area of the passive AF sensor 300.

On the boundary between "the image projection area" and "the non-image area" outside this image projection area on the screen 200, for example, "an area with a full white image with maximum brightness that can be projected" exists adjacent to "an area with lower brightness than the case where a black level image is projected".

Here, the black level image is brighter than the non-image area, because this is a general characteristic of the transmission type liquid crystal panels 120 and there is inevitably leakage of light in a totally closed state. The flare of the projection lens 140, or the leakage of light around the dichroic prism 130, etc., will also inevitably increase the brightness of the black level image. Such factors of lowering of contrast due to causes of the optical system will likewise exist in any display element other than a transmission type liquid crystal display panel, for example, an image display element, such as a reflection type micro-mirror driving element, an LCOS or other reflection type liquid crystal, an EL element, etc., and generally with an image projection apparatus, a black level image within the projected image area will inevitably be brighter than the non-image area.

Meanwhile since the lower side of the projected image is positioned close to the optical axis 102 of the projection lens 140, this is the location where the white with the highest brightness is easily obtained within the entire projected image.

Thus when a sensor output is obtained with this position included in the detection area of the passive AF sensor 300, the abovementioned boundary shows the maximum contrast that can be formed through projection by the projector. Even in a case where the projected image is a full gray image, since the brightness in the non-image area is low, an sufficiently high contrast can be obtained in the detection area of the passive AF sensor 300.

Also, even when the projection lens 140 is zoomed between the telephoto end and the wide-angle end, since the positional variation of the lower side of the projected image is small as described above, the abovementioned boundary will constantly be contained in the detection area of the passive AF sensor 300 without the need to adjust the center (optical axis) in the base line length direction of the detection area of the passive AF sensor 300 upward or downward.

The reflected light from detection area of the passive AF sensor 300 incident on the passive AF sensor 300 is received by the line sensor R36 and the line sensor L37 respectively via the abovementioned lenses 31 and 32, mirrors 33 and 34, and prism 35 shown in FIG. 2. The image data based on the signals obtained by photoelectrically conversion at the respective pixels of the line sensor R36 and line sensor L37 are then respectively stored in the memory A42 and memory B43 of the controller 160.

FIG. 4 shows a two-image correlation formed on the abovementioned line sensor R36 and line sensor L37.

In this case, images in the detection area of the passive AF sensor 300 are formed on the line sensor R36 and the line sensor L37 as shown FIG. 4A and FIG. 4B, respectively, and signals shown in FIG. 4C and FIG. 4D are output from the pixels group making up the respective line sensors. Image data shown in FIG. 4E and FIG. 4F, which correspond to the output signals shown in FIG. 4C and FIG. 4D, are stored respectively in the memory A42 and memory B43.

Then, the data in the memory A42 of this image data is input to the shift register 44 as shown in FIG. 4G, and the content of the shift register 44 is shifted sequentially in the direction of the arrow in the figure.

In this state, the CPU 41 compares the data pattern in the shift register 44 with the data pattern in the memory B43 (see FIG. 4H). When a match between both data pattern is detected by using a known judgment methods, such as the minimization of difference (=OR −AND), the maximization of AND, the minimization of OR, etc., the shift amount at this time is compared with the content stored in the ROM 45 to determine the distance to the screen 200. If necessary, the focusing accuracy is improved by using a data to be compared which is obtained by determining the differences between the data of respective adjacent pixels and then performing a correlation comparison process (differentiation process).

The data for which differences are to be determined do not have to be adjacent data, and difference between pixels that are separated by one pixel or difference between pixels that are separated by n pixel may be used. On the contrary, it may be performed the correlation comparison process to data group which is obtained by sequentially adding a plurality of data within a predetermined interval.

By then outputting the distance data to the motor driver 150, the focusing lens 148 is driven and focusing operation is performed.

By thus selecting an image generated by hardware in advance, projecting this image onto the screen 200 and enabling AF control, the focusing accuracy can be improved drastically without the need to waste extra memory and reduce burden in terms of cost.

The abovementioned embodiment has described the case of performing AF control by projecting a hardware-generated image of a character generator for OSD (onscreen display) that is equipped as a standard function of a projector, for AF detection, AF control may also be carried out by projecting a normal video image or other moving image formed by image signals from the image signal supply apparatus 180 or a computer monitor image.

Figure 5A:
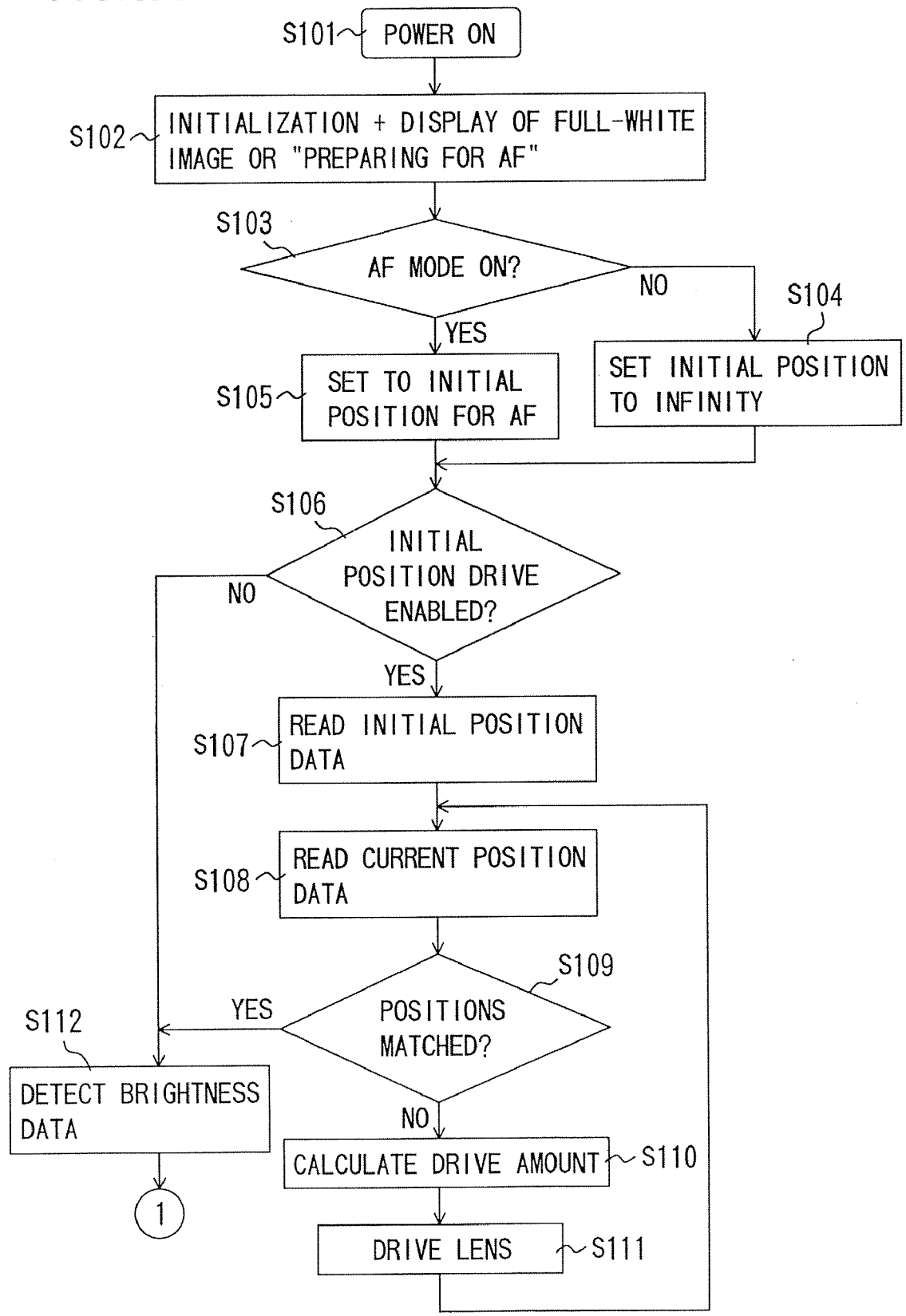
FIGS. 5A and 5B (also referred generally as FIG. 5) show a flowchart illustrating the operations of the projector of Embodiment 1.
Figure 5B:
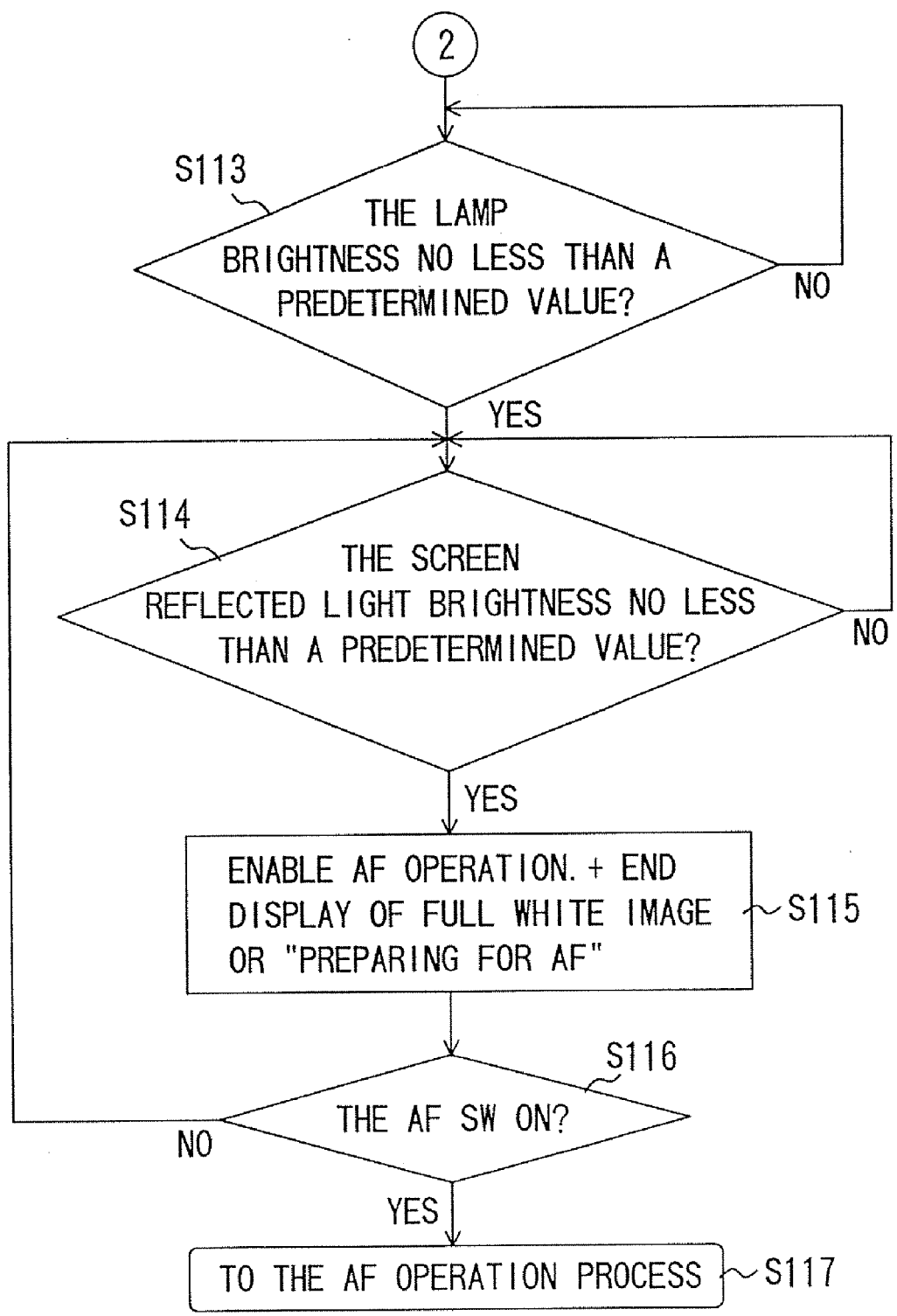

FIG. 5 is a flowchart showing a control algorithm for initial position drive of the focusing lens and AF enabling operation in this embodiment.

In FIG. 5, when the power switch of the operation panel 170 is turned on (when the power is turned on) (step (indicated hereinafter as "S") 101), the controller 160 performs an initialization operation (S102). Then, controller 160 starts up an unillustrated light source control circuit and makes an unillustrated stabilizer operate to generate a high-pressure lamp lighting voltage necessary for lighting up the light source 110 (which is a high-pressure mercury lamp here) and applies this voltage to the electrodes of the light source 110. Lamp lighting is thereby started (S102).

Also in the step S102, the controller 160 projects a full white image of the abovementioned character generator function or projects the characters of "Preparing for AF" (display indicating a state where AF control is restricted) on a projection image area other than the detection area for AF with a full white image as a background, from the point immediately after the lighting of the light source 101 until the AF enabling judgment is made in a subsequent step.

Thereafter, the state of an unillustrated AF mode switch which is provided on the operation panel 170 and operated to make the AF function effective (hereinafter referred to as "AF mode") or make the AF function ineffective, is detected. The AF mode switch is a mechanical, two-position slide type switch and may be of a simple structure so that a 1-bit signal is output. The controller 160 judges whether or not the AF mode is set on the basis of the ON/OFF state of the AF mode switch (S103).

If the AF mode is not set, the encoder data corresponding to the infinity position that is stored in the ROM 45 is selected as the initial position of the focusing lens 148 (S104). If the AF mode is set, an AF initial position data, stored in the ROM (memory) 45 as an initial value position of the focusing lens 148 suited for the AF mode, is selected and set (S105).

Here, as the initial position of the focusing lens 148 that is suited for the AF mode, in the projector of this embodiment, a substantially central position between the in-focus position of the focusing lens 148 with respect to the screen 200 when an image of the maximum dimensions is projected via the projection lens 140, that is, when the image is projected at the wide angle end, and the in-focus position of the focusing lens 148 with respect to the screen 200 when an image of the minimum dimensions is projected via the projection lens 140, that is, when the image is projected at the telephoto end, may be selected. A position of the focusing lens 148 when any image dimension within 40 inches to 100 inches is projected or the in-focus position of the focusing lens 148 for infinity may be selected as well.

This selection of the initial position of the focusing lens 148 may be carried out by a user when a mode in which the various conditions of the projector can be set is set by pressing an unillustrated menu mode switch.

The state of an initial position drive mode switch 170a (see FIG. 3), for setting whether or not the initial position drive is to be performed after the turning on of power, is then detected (S106). This switch 170a has the same structure as the abovementioned AF mode switch and is arranged on the operation panel 170. If the initial position drive mode switch 170a is in the disabled state, that is, in the case where the controller 160 judges that the initial position drive is not performed on the basis of the output signal of the initial position drive mode switch 170a, the process advances to step S112.

If the initial position drive mode switch 170a is ON, that is, in the state in which the initial position drive is enabled, the initial position data that is set in the AF mode judging process (S103) is read (S107), and the current lens position data is calculated on the basis of output signals of the encoders 142 and 144 provided on the projection lens 140 (S108).

The initial position data and the current position data are then compared, and if these data match, the process advances to step S112. If these data do not match, a drive amount of focusing les 148 corresponding to the difference between these data is calculated (S110), drive of the focusing lens 148 is performed (S111). And the process returns to step S108 and the abovementioned operations are repeated until the current position data of the focusing lens 148 matches the initial position data.

When the current position data matches the initial position data and the initial position drive is completed, the detection of the brightness data is started (S112).

Next, as the lamp brightness data, temperature data which is high correlative with the lamp brightness is obtained from an unillustrated temperature sensor provided near the lamp (light source 110) to estimate and the lamp brightness is estimated (S113). Here, since a temperature sensor is required in terms of securing safety in using the lamp, which becomes high in temperature, and is always provided in the projector. It is thus rational and also effective in cost that the temperature sensor is used to judge the brightness (estimate from the correlation).

If a temperature close to room temperature is detected by the temperature sensor after the elapse of a predetermined time from the start of the lighting operation of the lamp (light source 101), it can be estimated that the lamp is unlit. On the other hand, if a temperature rise is detected after a predetermined time from the start of the lamp lighting operation, it is assumed that the lamp has become lit. And it is judged whether or not the estimated temperature is a temperature corresponding to a brightness with which the focusing accuracy can be reliable and which is determined on the basis of the correlation data of temperature and brightness, by using a predetermined value. The general brightness in the projection environment, including fluctuating factors such as the lowering of brightness due to the screen gain and lamp life, etc., can thus be judged. If the judgment result does not reach the predetermined value (that is, while the lamp brightness has not reached the predetermined value), the process waits at step S113, that is, the focusing control is restricted. When the judgment result (lamp brightness) reaches the predetermined value, the process advances to step S114.

At step S114, brightness data on the reflected light of the projected light from the screen 200 is obtained to judge whether or not the brightness of the reflected light has reached a predetermined value.

In this embodiment, a predetermined number of the light receiving elements in the two line sensors 36 and 37 provided in the passive AF sensor 300 are used and the outputs thereof are subject to A/D conversion to evaluate the brightness of the abovementioned reflected light. Though the description of the two-image correlation of FIG. 4 concerned the comparison of 1-bit data string for the sake of convenience, here, conversion to digital data of plurality of bits is carried out to perform brightness evaluation of brightness states with a wide dynamic range.

By acquiring the brightness data a plurality of times while changing the accumulation time (gain) as necessary, the required dynamic range is obtained.

Since the lower end of the projected image (the boundary between the interior and the exterior of the projected image) is included at a middle part along the length in the line direction of the line sensor and the respective ends of the line sensor outputs the signal corresponding to the light imaged in the detection area at the interior and the exterior of projected image, the data of light receiving elements of the line sensor which is located at the respective sides of the abovementioned boundary are used for brightness evaluation. The brightness difference data between the brightness data of the projected image area and the brightness data of the non-image area can thereby be obtained at the same time.

Here, since the projected image is the full white image, the brightness data of the projected image area will be data with which the projected light of the maximum brightness is superposed with the environmental light and the brightness data of the non-image area will be data due only to the environmental light. The difference between the two brightness data will thus be the brightness due to projection by the projector, that is, the data of the projector brightness.

Furthermore, the abovementioned brightness evaluation is performed immediately after the lighting of the lamp as well, in this case, it is preferable to use data at the respective ends of the line sensor to increase the probability that the two data are the brightness data of the projected image area and the brightness data of the non-image area. Then, the brightness data of the screen (and the nearby environment onto which an image will be projected) 200 due to only the environmental light is obtained and stored. The rise of brightness can be detected from a comparison with brightness data obtained after the elapse of a predetermined lighting time.

In an infrared ray projection type active AF method or a passive AF method in the visible light aided light projection mode, which are often used in lens shutter cameras, there is an art of performing so-called external light elimination by emitting a projection light intermittently and performing a comparison calculation of the sensor outputs when light is projected and when light is not projected to eliminate the environmental light and improve the AF accuracy. However, with the AF method of this embodiment for a projector, the light source which is difficult to perform the high-speed blinking, such as the high-pressure mercury lamp, is used. Since the projection light is high in light amount and wide in projection range, high-speed blinking may cause discomfort of users. Thus, the above art cannot be employed. In a projector with which intermittent emission of the projection light cannot be performed, since the object onto which focusing is to be performed is a screen and does not move and vary in comparison with the object of camera, even if the span of intermittent emission along a time sequence is expanded, it is possible to perform the same type of external light elimination process. That is, the elimination of environmental light components by the detection of the brightness rise by comparison of data which are obtained by brightness measurements immediately after lighting and upon elapse of predetermined lighting durations at intervals of 10 seconds to 30 or more seconds is useful for AF of the projector.

Furthermore, in the case where the reflected light of the projected image area and the non-image area differ adequately in brightness from the point immediately after lighting of the lamp, the possibility that the exterior of the screen is black can be assumed, and, as the data pattern obtained by the detection operation after the rise of brightness, a white screen surface in the full white image projection area; a white screen surface outside the projection area; a black area at the periphery of the screen; and the conflicting distance parts of a wall surface or the interior of a room at the outer side of the screen; line up in that order from the inner side of the image and along the detection area. Also, in the case where the projection image is projected in a state of over-scan with respect to the white part of the screen (the effective range of projection is overlapped with a black part at the outer periphery of the screen), a white screen surface in the full white image projection area; a peripheral black area outside the screen and within the projected area; and the conflicting distance parts of a wall surface or the interior of a room at the outer side of the screen; line up along the detection area.

When a part of the line sensor, at which the first large variation occurs with respect to the pixel corresponding to the white screen surface of the full white image projection area, that is, the pixel at the end corresponding to the inner side of the image, is used for AF, the AF accuracy is improved since the contrast is high.

Also, even if the data of the respective ends of a line sensor are not used, the rise of the projection brightness can be detected by comparing the maximum value of the line sensor output immediately after the lighting of the lamp and the maximum value of the line sensor output after the elapse of a predetermined time.

Here, there is a possibility of erroneous judgment due to variation of the detection area of the passive AF sensor which is occurred by a position setting operation being performed from immediately after the lighting up of the lamp. To repress the erroneous judgement, position variation and orientation variation are detected by using an unillustrated detection sensor for detecting the setting state of the projector, such as a vibration detection sensor, direction detection sensor, GPS absolute position detection sensor, elongation position detection sensor for the projector's angle adjustment feet, angle sensor, vibration gyro sensor, etc., the abovementioned variation is monitored continuously, and it is assumed that the setting of the projector is completed at the point at which the variation has settled down. In the case where the abovementioned variation from the lighting up of the lamp to the completion of setting of the projector is no less than a predetermined value, the abovementioned estimation value obtained by comparing the brightness rise with data immediately after lighting should be deemed as being low in reliability and eliminated from the judgment algorithm. Also, in the case where the variation of the setting state of the projector continues after the start of the judgment of whether or not the lamp brightness has reached a predetermined value and the judgment of whether or not the brightness of the screen reflected light has reached a predetermined value, the flow may be looped so that the process at step S114 is performed again.

The detection of the completion of setting may be added as an AND condition (logical multiplication) for the start of judging of the brightness of the screen reflected light.

Since AF operation is not performed at a point at which the completion of setting is detected, the information on the distance to the screen 200 is not obtained at this point. In the usage environment of the projector, the projection distance is extremely limited. For example, since the projection distance has become shortened with the recent realization of wide-angle lenses, the percentage of use under circumstances such that an image of a size of 50 to 100 inches is projected from a distance of 1.5 m to 3 m is high, and the brightness due to such differences in image size will only fall within the range of a fourfold difference.

Thus for example, as a threshold value, 20% of the in-image brightness in the case of projection onto the screen at a gain of 1 and at the low brightness side of the abovementioned brightness range is stored in the ROM 45 and used in judgment as the abovementioned predetermined value.

At this level of brightness, a user can adequately recognize the projected image area and the AF accuracy will fall within a practical range.

With respect to an image boundary focusing method in this embodiment and the focusing method by using projected pattern (chart image), indicated as a prior-art, when the off-image brightness is high (the environment is bright), the contrast of the boundary of the image drops and the focusing accuracy degrades. Thus by judging whether or not the brightness difference between the interior and exterior of an image is adequate, along with judging whether or not the in-image brightness is no less than a predetermined value, a judgment of whether or not good focusing conditions have been attained can be made.

When as a result of the above-described judgment, the brightness of the screen reflected light is no less than the predetermined value, the process advances to step S115. If the brightness of the screen reflected light is not more than the predetermined value, the process returns to step S114 again.

At step S115, the controller 160 enables the acceptance of the AF operation. That is, the restriction of the focusing control is canceled. Here, the display of the full white image or the character display of "Preparing for AF" on a full white background is ended, and by the switching circuit 6 of FIG. 3, an image corresponding to the image signals from the image signal supply apparatus 180 is displayed.

At the same time, the controller 160 makes active the AF switch on the operation panel 170. The state of the AF switch is then detected in step S116.

If the AF switch is ON, the full white image is projected again and then the AF action process (S117) is started, while if the AF switch is OFF, the process returns to step S114. As described above, in the AF action process, data on the distance to the screen 200 is obtained based on the outputs from the passive AF sensor 300 and output to the motor driver 150 to drive the focusing lens 148.

Though in the flow of FIG. 5, the AF control is started in accordance with the will of the operator who operates the AF switch, the flow may be modified in a manner such that when after the setting of the projector, the projection brightness becomes no less than a predetermined value and the completion of setting is detected, the AF operation is started automatically without waiting for the judgment of the AF switch.

Also, though with this embodiment, the case where the characters of "Preparing for AF" are projected and displayed on the screen 200 is described, the characters of "Preparing for AF" or other mark may be displayed on a display unit such as a liquid crystal panel (for example, the operation panel 170) provided on the projector.

Also, in this embodiment, the case where "Preparing for AF" is displayed while AF control is actually being restricted, that is, the case where a display indicating a state in which the AF control is restricted is performed is described. Just the display of "Preparing for AF" may be performed without restricting AF control and a display indicating a state in which AF control should be restricted may be performed. Though in both cases, the "state of restriction for AF control" is indicated, in the latter case, a user can be notified that though AF control can be performed, the AF accuracy cannot be guaranteed.

Also, though with this embodiment, the case where the brightness data of the reflected light of the projected light is obtained based on signals from the AF sensor, that is, the case where the AF sensor is used in common for brightness detection is described, a dedicated brightness detection sensor for obtaining the brightness data may be provided instead.

Embodiment 2

Figure 6A:
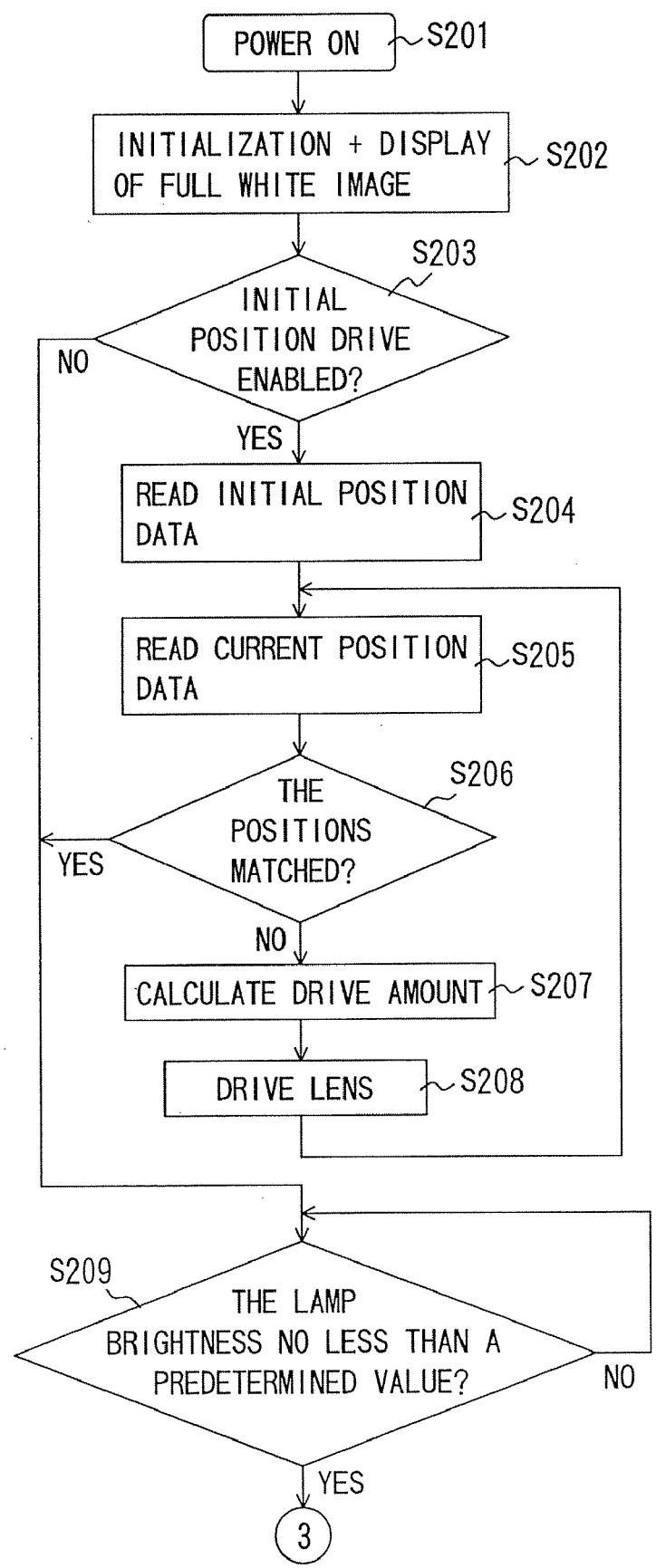
FIGS. 6A and 6B (also referred generally as FIG. 6) show a flowchart illustrating the operations of a liquid crystal projector, which is Embodiment 2 of the present invention.
Figure 6B:
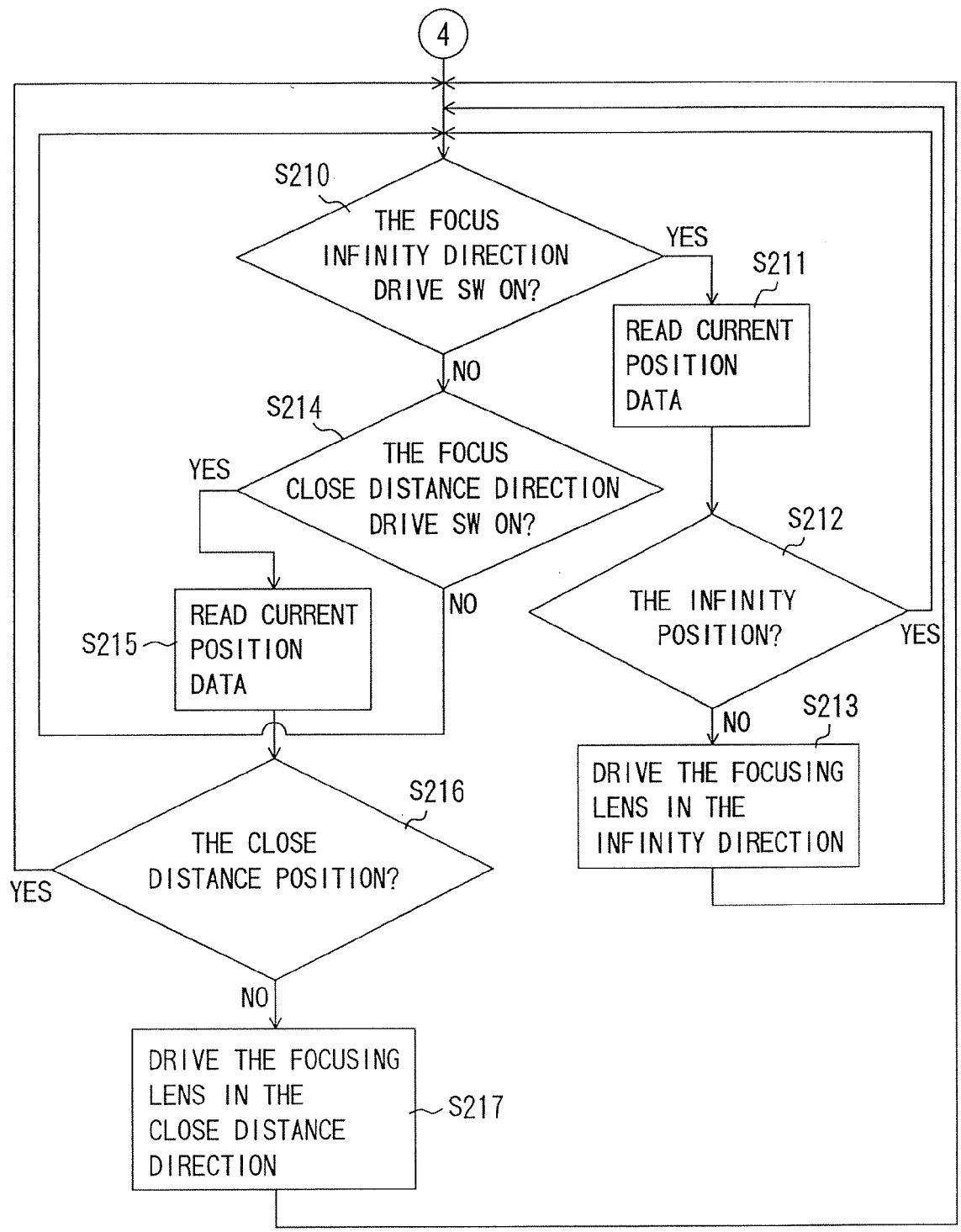

FIG. 6 is a flowchart illustrating the control algorithm for the initial position drive of the focusing lens and electromotive manual focusing operation in Embodiment 2 of the present invention. The flowchart of this embodiment applies to the operations of a projector, shown in FIG. 1, that does not have the AF function, or of a projector that has the AF function but is in a state in which a mode of not using AF function is set. Components in common to Embodiment 1 are provided with the same symbols as those of Embodiment 1.

In FIG. 6, when a power switch of an operation panel 170 is turned on (when the power is turned on (S201), a controller 160 performs an initialization operation (S202), and thereafter starts up an unillustrated control circuit and makes a stabilizer operate to generate a high-pressure lamp lighting voltage necessary for lighting up a light source 110 (which is a high-pressure mercury lamp here) and applies this voltage to the electrodes of the lamp 110. Lamp lighting is thereby started (S202).

Also in step S202, the controller 160 projects, by using the abovementioned character generator function, a full white image.

Thereafter, as in Embodiment 1, the state of an initial position drive mode switch 170a, which sets whether or not an operation of driving a focusing lens 148 to an initial position is performed after the turning on of power and disposed on the operation panel 170, is detected (S203). If the initial position drive mode switch 170a is set to the disabled state (the state in which the abovementioned operation of driving the focusing lens 148 is not performed), the process advances to step S209.

If the initial position drive mode switch 170a is ON, that is, if the initial position drive is enabled, the ∞ (infinity) position (or, in the case where a rotation angle of a focus operation ring 146 has an infinity side tolerance angle, the position of a mechanical stopper end at the infinity side), which is the initial position data of the focusing lens 148, is read from a ROM 45 (S204), and the current lens position data is obtained from encoders 142 and 144 (see FIG. 1) provided on a projection lens 140 (S205).

The initial position data and the current position data are then compared, and if these data match, the process advances to step S209. If these data do not match, a drive amount corresponding to the difference between these data is calculated (S207), drive of the focusing lens 148 is performed (S208), and the process returns to step S205 and the processes from step S206 to step S208 are repeated until the current position data matches the initial position data.

When the current position data matches the initial position data and the initial position drive of the focusing lens 148 is completed, the detection of the lamp brightness data is started.

Since the electromotive focusing drive of the projector is set so that the drive of the entire drive range is performed in a few seconds, the operations up to this point will be completed within such a time even at the longest. However, the lamp 110 is still dark at this point and is not yet in a state in which a user can perform focusing manually.

Thus as in Embodiment 1, temperature data, which is high in correlation with the lamp brightness, is obtained as the lamp brightness data from an unillustrated temperature sensor provided near the lamp to estimate the lamp brightness and judge whether or not the lamp brightness is no less than a predetermined value (S209). If the lamp brightness rises after a predetermined amount of time from the start of lamp lighting, it is assumed that lighting is successful and by using the abovementioned predetermined value, it is judged whether or not the temperature is that corresponding to a brightness which is determined from the correlation data of the rises in temperature and brightness and with which the manual focusing precision can be expected to be reliable.

Adequate judgment of the general brightness of the projection environment, including such fluctuating factors as the screen gain, lowering of brightness due to lamp life, etc., can thus be made. If the lamp brightness is less than the predetermined value, the process waits at step S209, that is, the focusing control is restricted, and when the lamp brightness reaches the predetermined value, the process advances to step S210. Electromotive focusing is thereby enabled.

Operations that are carried out in accordance with operations of unillustrated electromotive focus drive operation switches, which are provided on the operation panel 170, are indicated in step S210 onwards.

First, whether or not a focus infinity direction drive switch (not shown) is pressed is judged (S210), and if it is pressed, the output of the focus encoder 142 is read (S211) and whether or not the current position of the focusing lens 148 is the infinity end is judged (S212). If the focusing lens 148 is already at the infinity end, it is not driven and the process returns to step S210. In other cases, the focusing lens 148 is driven in the infinity direction (S213) and the process returns to step S210.

If it is judged in step S210 that the focus infinity direction drive switch is not pressed, whether or not the focus close distance direction drive switch (not shown) is pressed is judged (S214), and if it is pressed, the output of the focus encoder 142 is read (S215) and whether or not the focusing lens 148 is currently positioned at the close distance position is judged (S216). If the focusing lens 148 is already at the close distance position, it is not driven and the process returns to step S210. In other cases, the focusing lens 148 is driven in the close distance direction (S217) and the process returns to step S210.

By setting the initial position of the focusing lens 148 at the infinity end as described above, when electromotive focus is to be performed upon setting of the projector, the focusing lens 148 will already be set at the infinity end when a user operates a drive switch in either the infinity or the close distance direction and the focusing lens 148 will thus always move in the direction in which the in-focus state is achieved when it operates in accordance with the switch operation. Furthermore, since the operation starts from the infinity position, the probability that the in-focus position will be reached in a shorter time than when the operation is started from the close distance end will be high for distances up to normal projection distances for a large screen.

Even if the initial position of the focusing lens 148 is set to the close distance end, the in-focus state is achieved within a time difference corresponding to the difference in the amount of extension to the normal projection distance with respect to the case where the initial position is set at the infinity end, and the effect that the in-focus state is approached in a single operation direction is likewise obtained.

Also, though the description provided here concerned operations with a projector having an electromotive manual focus mechanism, by setting the initial position of the focusing lens at the infinity end, rapid focusing, due to the abovementioned effects of "always moving in the direction in which the in-focus state is achieved" and "the amount of extension to a normal projection distance being small," is also enabled during manual focusing in the case where a mode of not using AF function is set in a projector with an AF function and an electromotive manual focus mechanism, in the case of a projector that enables both AF and manual focusing, and in the case where, with a projector enabling focusing by electromotive and manual operations and having a projection lens that is arranged to enable operation of a manual ring, focusing is performed by operation of the manual ring.

The structure of the projector and AF method described in the respective embodiments above are simple examples and other structures and AF methods may be used instead.

As described above, with each of the above-described embodiments, the focusing control is restricted during the time for waiting for the brightness of discharge type light source such as a short arc length discharge type light source to rise.

That is, by restricting focusing control prior to the point at which a brightness state appropriate for focusing control is obtained, focusing control that may occur unstable or erroneous actions may be avoided in advance.

Also by displaying that a state is one in which focusing control should be restricted, a user can be made to recognize the reason why focusing control is not performed or that even if focusing control is performed, the focusing accuracy is not guaranteed.

Also with each of the embodiments described above, the restriction of focusing control is carried out as described above and the focusing lens is driven prior to focusing control to a predetermined drive position stored in a memory.

Here, the predetermined drive position may be set to a substantially central position of the total driving area of the focusing lens or at an hyperfocal distance upon setting the field angle at the wide-angle end at which the maximum projection size can be checked readily for adjusting the screen projection position under the initial settings. That is, the abovementioned predetermined drive position is preferably at substantially the center between a focus position when an image having the maximum dimensions is projected and a focus position when an image having the minimum dimensions is projected.

Also, the abovementioned predetermined drive position may be set a focus position corresponding to the projection distance for any of the image dimensions among a plurality of image size (for example of approximately 40 inches to 100 inches) that are determined by the vertical dimensions of a screen that can be taken up for practical purposes in a living space with a roof height of approximately 2.2 m to 3 m, which will be applicable to most projection environments, and the projection image aspect ratio of the projection type image display apparatus.

Since the initial position of the focusing lens (predetermined drive position) that satisfies the above conditions is high in the probability of existence of the projection distance for use and is high in the probability that the remaining drive amount of the focusing lens for focusing will be low, the focusing control can be performed rapidly.

Also, the predetermined drive position may be set to the infinity end, placing priority on the balance of operability during manual focusing by a user (for making the best in-focus position be always approached by rotation in one direction and making rotation in a reverse direction impossible, a movement end is preferable as the initial position of the focusing lens, and even if a directional indication is provided when manual focusing is performed, since the defocus direction will be unknown anyway, the wasteful reverse direction operation that occurs at a probability of ½ is consequently eliminated) and the effect of reducing the drive amount for focusing (since projection to a screen size of a minimum of several dozen inches is performed in most cases with a projector for large images, the extension amount to a position corresponding the abovedescribed projection distance from the infinity end is generally lower than that from the close distance end). That is, in the case where a mode of not performing focusing control can be set, the abovementioned predetermined drive position can be set to the infinity position when this mode is set.

The setting of the abovementioned predetermined drive position at the infinity position is thus advantageous for speeding up manual focusing and eliminating uncomfortable focus operations in the reverse direction and enables improvement of the operability in performing focusing operation by means of a motor or by hand.

By enabling a user to select the initial position of focusing lens, initial position setting that corresponds to the choices of the user and normally-used projection distance is enabled.

Also, even if focusing control is not performed, the focusing lens may be driven to the abovementioned predetermined drive position stored in the memory in accordance with the turning on of the power of the apparatus.

By thus driving the focusing lens to the predetermined drive position upon turning on of the power, it becomes possible to perform subsequent apparatus setting work, AF operation, manual focusing operation, etc., rapidly.

By equipping such functions as described above, high focusing accuracy can be maintained constantly during use and a projection type image display apparatus or the entirety of an image display system that includes the projection type image display apparatus can be made high in performance.

What is claimed is:

1. An image projection apparatus comprising:
a light source;
an image forming element which modulates light from the light source;
a projection optical system which includes a focusing lens and projects the light from the image forming element onto a projection surface; and
a controller which controls a drive of the focusing lens,
wherein, after turning one of the light source and the image projection apparatus on, the controller drives the focusing lens to a predetermined initial position at once; and
wherein the predetermined position is substantially at the center between a first in-focus position with respect to the projection surface when an image with the largest dimensions is projected and a second in-focus position with respect to the projection surface when an image with the smallest dimensions is projected.

2. An image projection apparatus comprising:
a light source;
an image forming element which modulates light from the light source;
a projection optical system which includes a focusing lens and projects the light from the image forming element onto a projection surface; and
a controller which controls a drive of the focusing lens,
wherein, after turning one of the light source and the image projection apparatus on, the controller drives the focusing lens to a predetermined initial position at once; and
wherein the predetermined position is an in-focus position corresponding to a projection distance for any image dimension from 40 inches to 100 inches.

* * * * *